United States Patent Office 3,360,858
Patented Jan. 2, 1968

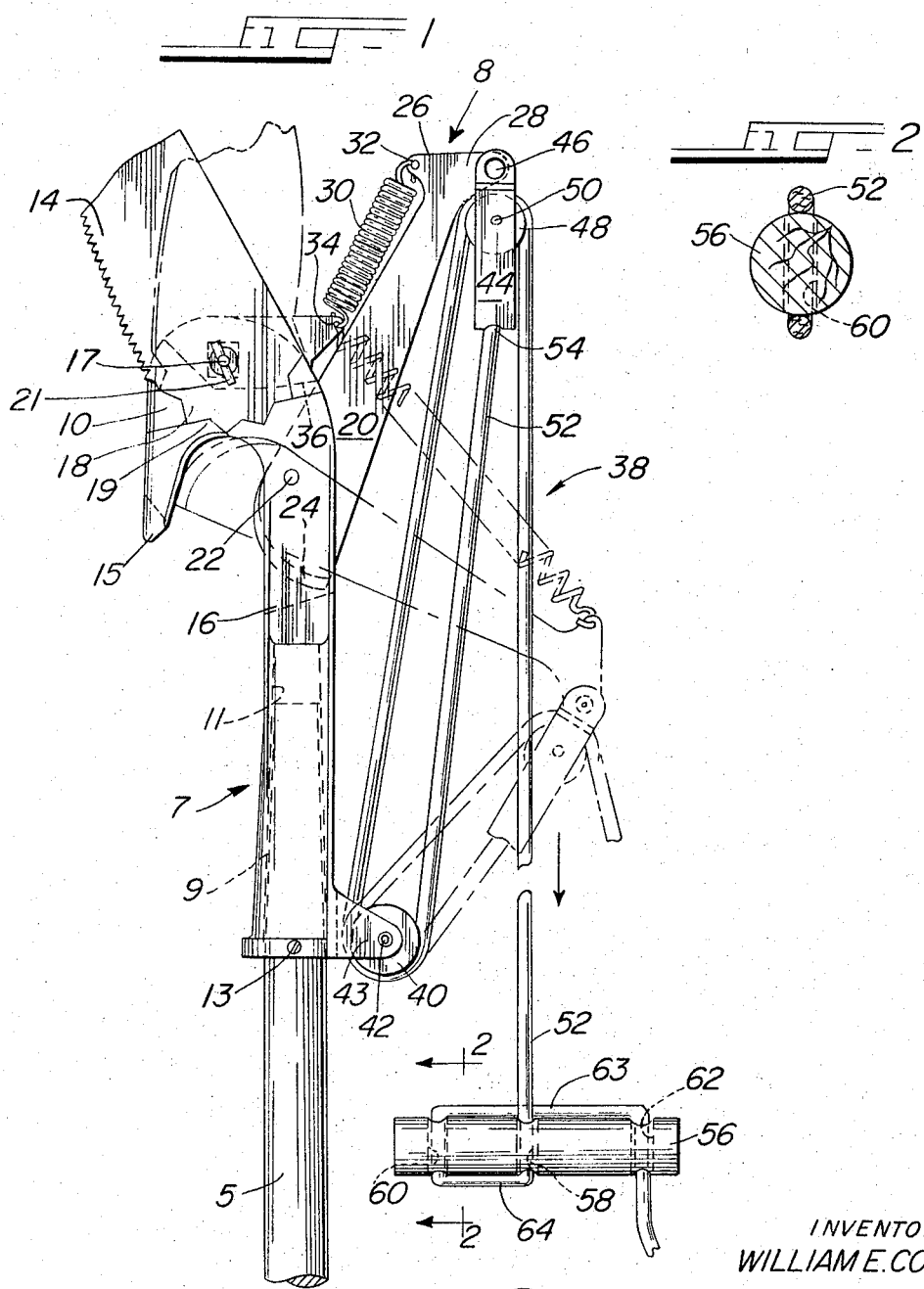

3,360,858
COMBINATION PRUNING DEVICE WITH
ADJUSTABLE HANDLE
William E. Cowley, Louisville, Ky., assignor to Vermont American Corporation, Louisville, Ky., a corporation of Kentucky
Filed June 28, 1966, Ser. No. 561,081
5 Claims. (Cl. 30—249)

The present invention relates to pruning devices and in particular to an improved pole support and pruner assembly having an adjustably mounted hand grip.

Pole supported pruner assemblies having a rope pull arrangement which operates a pivotally mounted shear blade are known in the art. It is a feature of the present invention to provide an effective, adjustable hand grip for associating with the rope pull to effectively improve a user's grip on the rope when applying a tensile force parallel to the line of pull and thereby to improve the operation of the shear blade.

Ordinarily, the rope or cord of material, such as hemp or cotton fibers, is gripped by the hand of an operator or wrapped around the operator's hand for applying a pulling force. Whichever manner the operator uses to grasp the the rope at a desired location, it is difficult to exert the pulling force. If the rope is gripped, the operator must exert a sufficient circumferential compressive force on the rope to prevent the slippage of his hand axially along the rope and simultaneously exert a tensile force parallel to the axis of the rope to operate the shear blade. Often, to reduce the relative size of the circumferential force, the operator wraps or loops the rope around his hand. In such cases, the rope tightens in a noose-like fashion around his hand as the pulling or tensile force is exerted; the rope binds the hand and constricts the flow of blood to portions of the hand beyond the looped rope, thereby inducing pain and discomfort. Such pain is particularly sharp when thicker branches are being cut. Some presently available pole pruning assemblies include a plastic pull rope, in place of fibrous ropes used in other models. Plastic rope presents the same problems as hereinbefore described, however, because of their smooth exterior surface, they are more difficult to grasp and, thus, the aforementioned disadvantages inherent in operating the pruner are increased.

Thus a principal object of the present invention is to provide a rope-operated pruning device which is convenient to use and is not subject to the aforedescribed disadvantages and shortcomings of the prior art.

A further and more specific object of the present invention is to provide the rope pull for such a device with a grip which is easy to hold and easy to pull upon when grasped by the hand of an operator.

Another object of the invention is to provide a pruning device with a rope pull having an adjustable handle of simple construction which is positive in operation, efficient and, although easily repositionable, maintains a desired pulling position.

A feature of the invention is that the grip is also easily movable to any desired position along the length of the pull rope associated therewith.

Thus in accordance with the objects, the present invention provides a combination pole supported pruning device which includes an adjustable saw and a pruner having a novel rope pull construction for operating the pruner or shear blade which comprises a length of rope and a handle associated therewith having a plurality of holes formed therein through which the rope is trained. To be most effective, the rope is threaded and looped through the holes so that the handle stays positively locked at a desired position along the rope when a pulling force is exerted thereon. The handle is of selected dimensions such that it may be conveniently grasped and is so designed and its connection to the rope so arranged that the rope pull may be easily pulled on without injuring the operator. At the same time the handle is also easily relocated by manipulating the rope through the holes to move the handle to a new location and then relocked thereat.

Other and further objects, features and advantages of the present invention will be apparent from the following description of an illustrated embodiment thereof given for the purpose of disclosure and taken in conjunction with the accompanying drawing which wherein:

FIGURE 1 is a side elevational view of a combination pole supported pruning device comprising an adjustable saw and a pruner assembly having an associated rope pull arrangement with an adjustable handle embodying the principles of the present invention; and FIGURE 2 is a sectional view taken along the line 2—2 of FIGURE 1, looking in the direction indicated by the arrows.

Referring now to the drawing, a pole or handle shown at 5 is detachably connected to a combination pruning device, illustrated generally at 7, useful for pruning trees and cutting twigs, small limbs and the like. The pole 5 may be of any chosen length; and longer and shorter poles may be assembled to the combination pruning device 7 to reach branches of different heights. An extendable pole may be substituted for selectively extending the device vertically upward into the tree without the nuisance of having to change handles. A tapered end portion 9 of the handle 5 is adapted for insertion into a tapered bore 11 formed internally of the device 7. To fix the handle 5 to the device 7 and to prevent its accidental displacement therefrom, a fastener 13 passes through an aperture in such device and into engagement with the handle 5.

A pruner body portion 16 of the device 7 comprises a pruner assembly 8 at a central portion and a blade mounting portion 10 at the outer end thereof. A saw blade 14 is pivotally mounted to engage, at one side thereof, against a side wall portion of the mounting portion 10. A shouldered bolt 17 is extended through an aperture in the portion 10 perpendicularly to said inner side wall thereof. The shank of the bolt and the aperture being of a complementary, noncircular configuration retain the bolt against rotation with respect to portion 10. The shank of the bolt defines a pivot axis for the blade 14 being rotatably mounted on the outer end of the bolt 17, with the bolt passing through an aperture in the blade. The blade is adapted to be alternately positioned on the blade mounting portion 10 by teeth or projections 18 of the blade being alternately disposed in complementary raised teeth or projections 19 defined on the mounting portion. Since the projections 18 and 19 are complementary, the blade 14 may be moved inwardly on the bolt 17 to abut the side surface of the blade and the inner side wall as hereinbefore discussed, with the projections 18 and 19 being interlocked to prevent accidental rotation of the blade. Means, such as a wing nut 21, are threaded on the bolt shank to mount the blade on the body. When the nut is loosened, it accommodates disengagement of the projections and pivotal movement of the blade 14 about the bolt 17. Tightening the nut forces the side surface of the blade toward the inner side wall surface of portion 10 to force some of the projections 18 of the blade into interlocking relation with the projections 19. The saw blade 14 is thereby rapidly adjustable to a plurality of positions for sawing relatively larger branches than can be cut by the pruner assembly. For a more complete description of the structure and operation of the adjustable saw blade, reference should be had to the patent of W. M. McCord, Jr., U.S. Patent No.

2,762,407, issued Sept. 11, 1956, which patent is assigned to the assignee of the present invention.

To facilitate the operative connection of the pruner assembly 8 with the twigs or limbs to be cut, a hook portion 15 extends downwardly of body 16. Said pruner body is longitudinally slotted to receive a shear blade 20 which is pivotally mounted therein at 22. The shear blade has a sharpened edge 24 adapted to guillotine or cut twigs and branches which are engaged by the hook 15. At the outer end of the shear blade 20 are a pair of outstanding ears 26 and 28. Biasing means, in the form of a spring 30, mount to the ear 26 at 32 and to the pruner body at 34 and bias the shear blade 20 about the pivot 22 in a counterclockwise direction as viewed in FIGURE 1. A shoulder portion 36 formed internally of the pruner body 16 at the upper end of the slot therein is adapted to abut the upper edge of the shear blade 20 and to limit the counterclockwise rotation thereof to a position as shown in solid lines. With the blade held in this position, branches are operatively engageable by the hook 15 for subsequent shearing.

Pull means, shown generally at 38, are operatively connected to the shear blade 20 for moving said blade about its pivot 22 to guillotine the engaged branches or twigs. The pull means 38 include a pulley wheel 40 attached to the pruner body by an axial support 42 mounted in aligned holes through the wheel 40 and a bifurcated portion 43 integrally formed of the body 16. A U-shaped strap 44 is mounted to the outstanding ear 28 at pivot 46. Rotatably mounted to the U-shaped strap 44 about an axle 50, is a pulley wheel 48.

According to the present invention, the pull means 38, which operates shear blade 20, is actuated by pulling on a pull member, such as rope 52, dead-ended to the U-shaped strap 44 at 54. As illustrated, rope 52 is trained downwardly from its connection at 54 around the pulley wheel 40 and thence upwardly through hte bifurcated portion 43 and around the pulley wheel 48, through strap 44, and downwardly therefrom to a handle grip 56 comprising the present invention. The bifurcated portion 43 and the U-shaped strap 44 cooperate with the respective pulleys mounted therein to keep the rope 52 operatively trained over the pulleys. The pull member shown is a cotton rope; however, it may also comprise plastic, flexible metal wire or other solid or woven member imparting flexibility as well as strength.

A feature of the invention is the use of a handle 56 which is located at an appropriate location along the length of rope 52 and is suitably shaped and sized for comfortable gripping. The handle 56, as shown, is a rigid wooden cylinder, however, it may also comprise plastic or other material presenting a smooth exterior surface which agreeably fits in a user's hand. Materials which are non-conductive, particularly with respect to heat, enhance the comfort of the user in all seasons. The length of the grip 56 is sufficiently long to span the clenched fist of the user and is of such a diameter and bulk for convenient grasping by said fist. For comfortable use by an average hand, an example of minimum dimensions calls for a cylinder approximately 4½ inches long and ¾ inch in diameter.

A novel, effective looping of the rope is shown wherein the rope 52 is sequentially disposed through the holes 58, 60 and 62 formed in the grasp 56 so as to positively position the same at a desired location along the length of the rope. The size of the holes is selected to be slightly larger than the diameter of the rope so as to provide sufficient friction between the holes and the rope to assure positive positionment and sufficient play to assure easy adjustment. One example comprises a rope having a ¼ inch diameter and a grasp 56 having ⅜ inch diameter holes. Such threading prevents the grasp from slipping along the rope 52 once a convenient location has been chosen. The grip is adjustable, should a repositioning of the handle be desired.

In the illustrated embodiment, the rope 52 is led downwardly through the central hole 58 and then under the grip 56 to one of the end holes. The rope 52 is then led upwardly through the end hole 60 and from there across the top of the handle to the top of the hole 62 and downwardly therethrough. The looping of the pull member 52 through the holes in this manner effectively positions the handle grip 56. Tension exerted through the grasp member tends to pull the rope parallel to the line of pull as shown by the arrow in FIGURE 1 and causes said rope to make four abrupt turns where it goes through said grasp member. The rope has sufficient flexibility and is of such a diameter that it lies closely adjacent the body of the handle along its length as shown in FIGURE 2. The more flexible the rope is, the larger diameter it may comprise. The abrupt turns of the rope and the friction between the rope and the inner surface of the holes, holds the grasp at the desired portion. All pulling force applied by a user is operatively connected through the pull means to the shear blade. The diameter and bulk of grasp 56 is effectively increased by parallel portions 63 and 64 of the rope such that its size is convenient for gripping in the fist of an adult hand. The grasp of the user holds portions of the rope against the grip which helps to prevent the rope from slipping through the holes. With the rope lying smoothly along the longitudinal surface of the grip 56, a somewhat ovate grasp is formed which heightens the comfort of the user and increases the overall bulk of the grasp so that the fist is less tightly clenched thereabout. It is obvious that the holes may be canted with respect to each other and that the sequence of looping the rope through the holes may be varied and yet a positively positioned grip results.

Thus, the present invention provides an efficient and usable handle associated with a rope pull arrangement for operating a pruner assembly. The adjustable handle is positive in operation and yet is highly economical, practical and efficient.

Although I have described my invention with respect to a certain specific embodiment thereof, I do not wish to be thereby limited, as various modifications of my invention are intended to be encompassed within its true spirit and scope as indicated by the following claims.

I claim:

1. In combination, a pole supported pruner assembly having an integral hook portion defining a branch-engaging opening and a shear blade pivotally mounted for movement into said opening for guillotining branches engaged therein, biasing means holding said shear blade in a retracted position spaced from said hook portion, pull means for actuating said shear blade against the action of said biasing means, the pull means including a length of flexible cord and an adjustable hand grip secured to the cord, said hand grip comprising: a member of a size and shape to be conveniently hand grasped having a plurality of axially spaced transverse holes formed therein, the cord being looped through the holes in such manner as to positively position said member on the cord for facilitating the grasping of the cord to apply a force substantially parallelly along the length of the cord without slippage of the member.

2. A combination as in claim 1 wherein the holes are parallelly aligned along the length of said member.

3. A combination as in claim 1 wherein said member is cylindrical and the holes are formed diagonally thereacross and perpendicularly to the longitudinal axis thereof.

4. A combination as in claim 3 wherein the holes are aligned along said member and comprise a pair of end holes and a center hole therebetween.

5. A combination as in claim 4 wherein said member is positioned along the length of the cord, said cord being threaded downwardly through the center hole, transversely along and adjacent said member to one end hole, upwardly through the one end hole, transversely along and adjacent said member to a second end hole, and downwardly through said second end hole.

References Cited

UNITED STATES PATENTS 517,385   3/1894   Joyce ---------------- 30—249
627,215   6/1899   Stewart ------------ 24—129 X
2,259,642 10/1941  Hoyt -------------- 30—249

WILLIAM FELDMAN, *Primary Examiner.*
J. C. PETERS, *Assistant Examiner.*